US011870148B2

(12) United States Patent
Crouch et al.

(10) Patent No.: US 11,870,148 B2
(45) Date of Patent: Jan. 9, 2024

(54) PLANAR METAL FRESNEL MILLIMETER-WAVE LENS

(71) Applicant: RAYTHEON COMPANY, Waltham, MA (US)

(72) Inventors: David D. Crouch, Farragut, TN (US); Hooman Kazemi, Thousand Oaks, CA (US); Alexander Borisovich Brailovsky, Irvine, CA (US)

(73) Assignee: RAYTHEON COMPANY, Waltham, MA (US)

( * ) Notice: Subject to any disclaimer, the term of this patent is extended or adjusted under 35 U.S.C. 154(b) by 57 days.

(21) Appl. No.: 17/524,644

(22) Filed: Nov. 11, 2021

(65) Prior Publication Data

US 2023/0148063 A1 May 11, 2023

(51) Int. Cl.
*H01Q 19/06* (2006.01)
*H01Q 1/38* (2006.01)

(52) U.S. Cl.
CPC ............. *H01Q 19/065* (2013.01); *H01Q 1/38* (2013.01)

(58) Field of Classification Search
CPC ........ H01Q 19/056; H01Q 1/38; H01Q 15/04; H01Q 15/08; H01Q 15/10; H01Q 15/144
See application file for complete search history.

(56) References Cited

U.S. PATENT DOCUMENTS 2,636,125 A * 4/1953 Southworth ............ H01P 1/213 343/834
2,763,860 A * 9/1956 Ortusi .................... H01Q 15/10 343/753
2,908,001 A * 10/1959 Kelly ..................... H01Q 21/20 343/756
2,985,880 A * 5/1961 McMillan .............. H01Q 15/08 428/118
3,329,958 A * 7/1967 Anderson .............. H01Q 15/10 343/753
4,156,878 A 5/1979 Dion
4,321,604 A 3/1982 Ajioka
6,049,311 A * 4/2000 Alexanian ............ H01Q 21/064 343/753

(Continued)

FOREIGN PATENT DOCUMENTS

CN 103178353 A * 6/2013
CN 108110435 A * 6/2018 ......... H01Q 13/0241

(Continued)

*Primary Examiner* — Dimary S Lopez Cruz
*Assistant Examiner* — Jordan E. DeWitt
(74) *Attorney, Agent, or Firm* — LEWIS ROCA ROTHGERBER CHRISTIE LLP

(57) ABSTRACT

A planar conductive millimeter-wave lens includes: a planar conductive plate with a first surface and a second surface, wherein the first surface is parallel to the second surface; a plurality of openings from the first surface through the planar conductive plate to the second surface, where an axis of each opening is perpendicular to the first surface and the second surface. A size of each opening is a function of a position of said each opening on the planar conductive plate such that an insertion phase collectively imposed by the openings on an incident wave causes the incident wave to pass through the first surface and the planar conductive plate, exit from the second surface and to focus at a predetermined distance from the second surface.

10 Claims, 6 Drawing Sheets

(56) References Cited

U.S. PATENT DOCUMENTS

| | | | | | |
|---|---|---|---|---|---|
| 6,081,239 | A * | 6/2000 | Sabet | H01Q 19/062 343/753 |
| 7,777,690 | B2 * | 8/2010 | Winsor | H01Q 19/06 343/911 R |
| 8,963,787 | B2 * | 2/2015 | Lee-Bouhours | H01Q 15/08 343/753 |
| 9,583,840 | B1 | 2/2017 | Lawrance | |
| 10,547,118 | B2 * | 1/2020 | Guntupalli | H01Q 15/08 |
| 11,139,138 | B2 * | 10/2021 | Inoue | H01J 37/20 |
| 2004/0022677 | A1 * | 2/2004 | Wohlstadter | G01N 21/253 422/52 |
| 2008/0088524 | A1 * | 4/2008 | Wang | H01Q 15/0086 343/909 |
| 2009/0147379 | A1 * | 6/2009 | Li | H01L 27/14627 359/741 |
| 2010/0066639 | A1 * | 3/2010 | Ngyuen | H01Q 15/08 343/911 R |
| 2010/0283695 | A1 * | 11/2010 | Geterud | H01Q 15/06 343/753 |
| 2010/0295744 | A1 * | 11/2010 | Lofbom | H01Q 21/0087 343/753 |
| 2016/0294068 | A1 * | 10/2016 | Djerafi | H01Q 9/16 |
| 2018/0166792 | A1 * | 6/2018 | Yoshida | H01Q 15/08 |
| 2018/0287262 | A1 * | 10/2018 | Patri | H01Q 13/02 |
| 2019/0006743 | A1 * | 1/2019 | Kirino | H01Q 1/2283 |
| 2020/0018874 | A1 * | 1/2020 | Chisum | H01Q 15/10 |
| 2020/0227807 | A1 * | 7/2020 | Kirino | H05B 6/707 |
| 2021/0359421 | A1 * | 11/2021 | Feng | H01Q 19/062 |
| 2022/0109245 | A1 * | 4/2022 | Yang | H01Q 3/245 |
| 2022/0239007 | A1 * | 7/2022 | Biswas | H01Q 3/2658 |
| 2022/0294111 | A1 * | 9/2022 | Yektakhah | H01Q 15/08 |
| 2022/0416433 | A1 * | 12/2022 | Sledkov | H01Q 15/10 |
| 2023/0198158 | A1 * | 6/2023 | Crouch | H01Q 19/065 343/911 R |
| 2023/0228909 | A1 * | 7/2023 | Hanania | G02B 1/002 349/200 |

FOREIGN PATENT DOCUMENTS

| | | | | | |
|---|---|---|---|---|---|
| CN | 109742556 | A * | 5/2019 | |
| CN | 213878434 | U * | 8/2021 | |
| CN | 213878435 | U * | 8/2021 | |
| CN | 113851856 | A * | 12/2021 | |
| CN | 113991300 | B * | 5/2022 | |
| CN | 114583464 | A * | 6/2022 | |
| CN | 217983700 | U * | 12/2022 | |
| EP | 1120857 | A2 * | 8/2001 | H01Q 15/02 |
| EP | 4012840 | A2 * | 6/2022 | H01Q 15/04 |
| WO | WO-9324307 | A1 * | 12/1993 | H01Q 1/38 |
| WO | WO-2020218927 | A1 * | 10/2020 | H01Q 15/08 |
| WO | WO-2021145780 | A1 * | 7/2021 | H01Q 15/04 |
| WO | WO-2021226669 | A1 * | 11/2021 | |
| WO | WO-2022093042 | A1 * | 5/2022 | H01Q 15/10 |

* cited by examiner

PLANAR METAL FRESNEL MILLIMETER-WAVE LENS

STATEMENT REGARDING FEDERALLY SPONSORED RESEARCH

This invention disclosure is related to a government contract number HQ0727-16-D-0006-HQ-0727-20-F-1625. The U.S. Government has certain rights to this invention.

FIELD OF THE INVENTION

The disclosure relates generally to millimeter-wave lenses and more specifically to a planar metal Fresnel millimeter-wave lens.

BACKGROUND

Millimeter waves are electromagnetic waves having wavelengths between 1 and 10 millimeters and frequencies between 30 and 300 gigahertz (GHz). Compared to lower bands, radio waves in this band have high atmospheric attenuation, because they are absorbed by the gases in the atmosphere, and therefore they have a relatively short range. Millimeter-waves propagate primarily by line-of-sight paths and are being increasingly used in a variety of applications, such as, scientific research (e.g., radio astronomy and remote sensing), telecommunications (including the new generation of 5G cell phone networks), collision avoidance, military/weapon systems, security screening, plasma heating for inertial confinement fusion, material processing, medicine, law enforcement, and the like. In all these applications, there is a need for quasi-optical beam processing elements (such as lenses) that are capable of high average power operation.

Signal polarization is important in radio communications because, for instance, if one attempts to use a horizontally polarized antenna to receive a vertically polarized transmission, the signal strength will be substantially reduced. This principle is used in some satellite communications in order to double the channel capacity over a fixed frequency band. The same frequency channel can be used for two signals broadcast in orthogonal polarizations. By adjusting the receiving antenna for one or the other polarization, either signal can be selected without interference from the other.

Conventional lenses, whether millimeter or optical lens, operate by varying the physical path length over which the incident radiation must traverse to pass through the lens in a manner similar to conventional dielectric lenses. Existing metal lens designs fall generally into two classes. Parallel-plate metal lenses consist of a number of parallel metal plates that act like waveguides for incident radiation polarized parallel to the plates. The depth of the plates is varied as a function of position relative to the center of the lens to impart the desired shape to incident wave fronts. Perforated plate lenses consist of a uniform array of circular holes/openings; one or both plate surfaces are shaped as a means of varying path length with position. A lens having high-power capability is needed to process high-intensity millimeter beams. However, dielectric lenses have low thermal conductivity. Likewise, existing metal lenses require non-planar surfaces, and have added weight and higher insertion loss. Also, the thermal conductivity of parallel plate metal lenses is inhibited by the thinness of the plates and the fact that heat is conducted along one direction only. Accordingly, there is a need for low-loss quasi-optical beam processing elements (such as lenses) capable of high average power operation.

SUMMARY

Present disclosure is directed to planar metal Fresnel millimeter-wave lenses.

In some embodiments, a planar conductive millimeter-wave lens includes: a planar conductive plate with a first surface and a second surface, wherein the first surface is parallel to the second surface; a plurality of openings from the first surface through the planar conductive plate to the second surface, wherein an axis of each opening is perpendicular to the first surface and the second surface, wherein a size of each opening is a function of a position of said each opening on the planar conductive plate such that an insertion phase collectively imposed by the openings on an incident wave causes the incident wave to pass through the first surface and the planar conductive plate, exit from the second surface and to focus at a predetermined distance from the second surface.

In some embodiments, a method of fabricating a planar conductive millimeter-wave lens, the method includes: providing a planar conductive plate with a first surface and a second surface, wherein the first surface is parallel to the second surface; and forming a plurality of openings from the first surface through the planar conductive plate to the second surface, wherein an axis of each opening is perpendicular to the first surface and the second surface, wherein a size of each opening is a function of a position of said each opening on the planar conductive plate such that an insertion phase collectively imposed by the openings on an incident wave causes the incident wave to pass through the first surface and the planar conductive plate, exit from the second surface and to focus at a predetermined distance from the second surface.

In some embodiments, the openings may be arranged in the planar conductive plate in an equilateral triangular pattern, in a rectangular, square or circular pattern.

BRIEF DESCRIPTION OF THE DRAWINGS

A more complete appreciation of the disclosed invention, and many of the attendant features and aspects thereof, will become more readily apparent as the disclosed invention becomes better understood by reference to the following detailed description when considered in conjunction with the accompanying drawings in which like reference symbols indicate like components.

DETAILED DESCRIPTION

In some embodiments, the disclosure is directed to a planar metal Fresnel millimeter-wave lens. The lens may be disposed in association with a horn antenna, as a quasi-optical element for millimeter beams, to produce a collimated millimeter wave beam. The planar metal Fresnel millimeter-wave lens is a planar conductive plate perforated by a periodic array of cylindrical openings (holes) of varying diameters.

In general, a Fresnel lens reduces the amount of material required compared to a conventional lens by dividing the lens into a set of concentric annular sections. An ideal Fresnel lens would have an infinite number of sections. In each section, the overall thickness is decreased compared to an equivalent simple lens. This effectively divides the continuous surface of a standard lens into a set of surfaces of the same curvature, with stepwise discontinuities between them. The Fresnel design allows the construction of lenses of large aperture and short focal length without the mass and volume of material that would be required by a lens of conventional design. Fresnel lenses are usually made of glass or plastic.

Figures 1A, 1B, 1C:
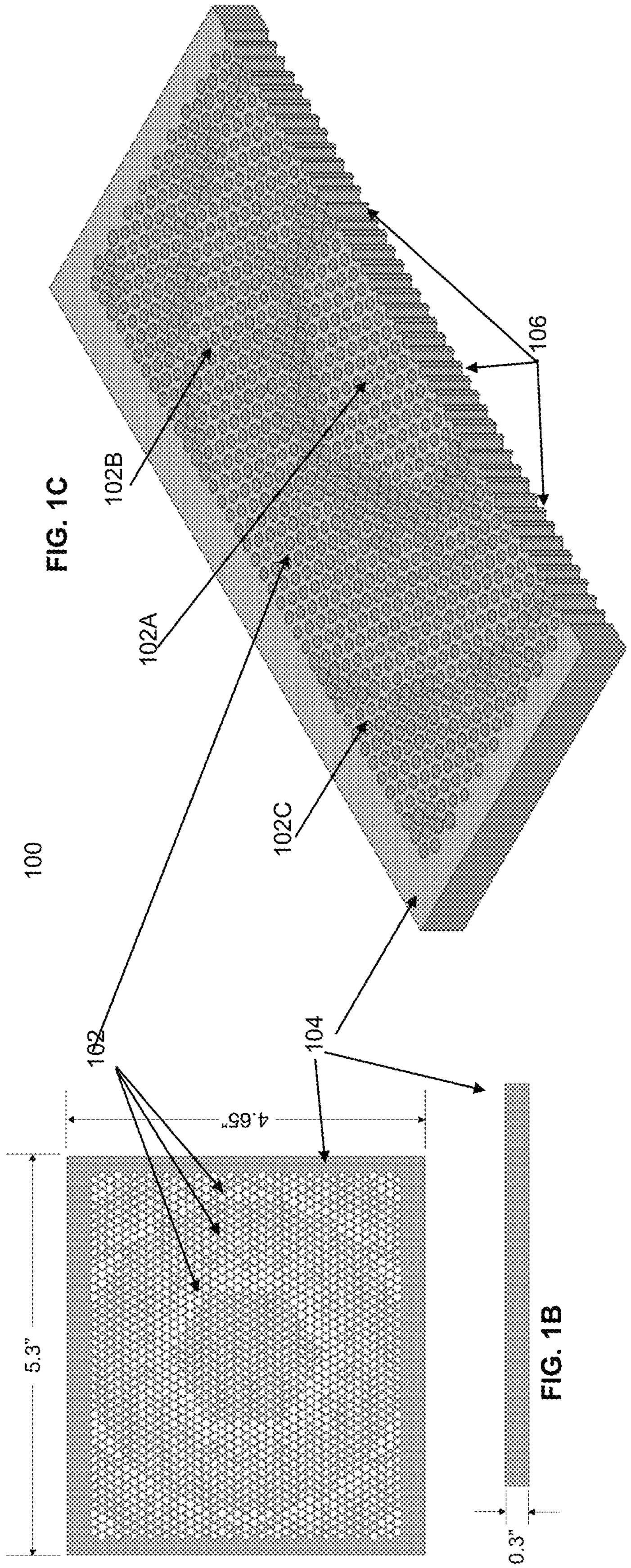
FIG. 1A depicts a top view.
FIG. 1B shows a side view and FIG. 1C illustrates a perspective view of a cut-off portion of a planar metal millimeter-wave lens, according to some embodiments of the disclosure.

FIGS. 1A, 1B and 1C show a planar metal Fresnel millimeter-wave lens 100, according to some embodiments of the disclosure. FIG. 1A depicts a top view, FIG. 1B shows a side view and FIG. 1C illustrates a perspective view of the cut-off portion of the lens 100. As shown, the lens has an all-metal lens construction with a planar architecture and includes an array of variable diameter cylindrical openings 102 distributed on a uniform equilateral triangular grid pattern. In some embodiments, the lens may be constructed from aluminum or titanium and the aluminum or titanium plate may be coated with gold to increase its conductivity. A planar conductive plate 104 (e.g., an aluminum plate) is perforated by a periodic array of cylindrical openings 102 of varying diameters. For example, for embodiments designed for operation near 95 GHz, the opening diameters may vary from 74 to 110 mils and the center-to-center spacing may vary from 110 to 120 mils. The opening arrangement (pattern) and opening shapes may also vary depending on the incident beam, lens size and its application.

In some embodiments, the planar conductive plate 104 may be a dielectric material plated with a suitable conductor (e.g., copper, gold, etc.), instead of a planar solid metal plate. The dielectric material is chosen for its mechanical and/or thermal properties rather than its electrical properties, since the plating shields it from incident electromagnetic waves. This approach might be desirable for weight reduction, fabrication cost (it might be more cost effective to form a perforated plate from dielectric than metal, injection-molded plastic, for example).

The range of opening diameters and center-to-center spacing are frequency dependent. The illustrative embodiments are designed to operate at 95 GHz; this dictates the smallest opening size and the maximum center-to-center spacing. For circular openings, the smallest opening diameter is determined by the cut-off frequency for cylindrical waveguide, which is $$f_c = \frac{1.8412c}{2\pi a} \tag{1}$$

where c is the speed of light in vacuum and a is the waveguide radius (or in our case the opening radius). Below $f_c$ electromagnetic waves cannot propagate in the waveguide. This equation can be rearranged to determine the minimum possible opening diameter in a lens configuration. If $f_{lens}=f_c=95$ GHz, $$a_{min} = \frac{1.8412c}{2\pi f_{lens}} \tag{2}$$

which yields a minimum opening diameter of $2a_{min}=72.86$ mils. This way, most of the incident power is reflected for opening diameters at and just above cutoff.

As for center-to-center spacing, grating lobes may appear if the center-to-center opening spacing is too large. Grating lobes, which are normally associated with phased-array antennas, are secondary beams which are approximately the same amplitude as the main beam. In phased-array applications in which the beam is electronically scanned in azimuth and elevation, the maximum center-to-center spacing is typically one-half wavelength at the maximum operating frequency. However, for the embodiments that do not scan the beam, a larger spacing is tolerable. In some embodiments, an opening spacing of 120 mils is just less than one wavelength for an operating frequency of 95 GHz (124 mil wavelength). However, if the spacing is too large, grating lobes can appear even if the beam is not scanned.

As shown in FIG. 1C, the variable diameter cylindrical openings 102A, 102B and 102C have a cylindrical shape 106 that extend from the top of the plate 104 to its bottom with varying diameters and a uniform triangular grid pattern. For example, as shown in FIGS. 1A and 1B, the openings 102A around the center of the plate 104 have smaller diameters than the openings 102B in the middle of the plate 104. Also, the openings 102C towards the perimeter of the plate 104 may have larger or smaller diameters than the openings 102A or 102B.

Although, the arrangement pattern of the cylindrical openings 102 is shown as an equilateral triangular pattern as an example, the arrangement pattern of each or all of the openings 102A, 102B and 102C may vary from the equilateral triangular pattern and be different from each other. For example, openings 102A may have a rectangular pattern, while openings 102B may have a square pattern and openings 1C may have a circular or triangular pattern, or any combination thereof.

Figure 2:
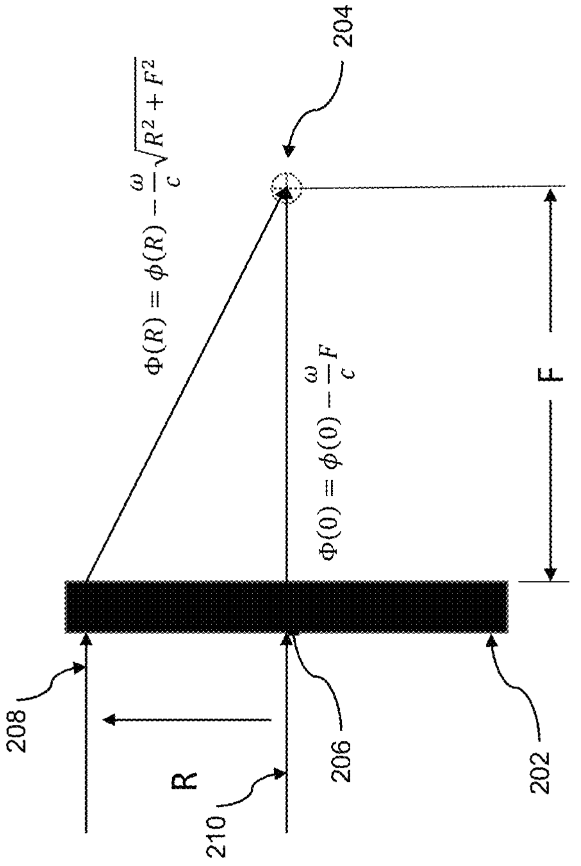
FIG. 2 illustrates schematic of design parameters of a planar metal millimeter-wave lens, according to some embodiments of the disclosure.

FIG. 2 depicts a diagram depicting the design parameters of a planar metal millimeter-wave lens, according to some embodiments of the disclosure. As shown, the planar metal lens 202 includes a focal point 204 at a distance F from the lens 202, a lens center 206 with a distance from center to the edge of R. Φ is the total phase shift, where Φ (R) is the phase shift of a beam 208 incident at the distance R from the center of the lens, Φ(0) is a phase shift of a beam 210 incident at the center of the lens 206, and is the insertion phase and a function of opening size.

It is well known that the phase velocity of guided waves propagating in a waveguide varies with waveguide dimensions. Lenses according to the present disclosure leverage this fact by tailoring the insertion phase as a function of position via opening diameter rather than plate thickness. As known, the phase shift per unit length of a wave in free space is given by $$\frac{\omega}{c},$$

where ω is equal to 2πf and c is the speed of light, where f is the frequency. In free space, this phase shift is equal to 2π/λ, where λ is the wavelength of beam. Consequently, the phase velocity in free space is given by the speed of light (c) and the phase velocity in the parallel plate waveguide within free space is provided by:

$$\frac{\omega}{c} = 2\pi/\lambda \tag{3}$$

Accordingly, the phase shift of a beam 210 incident at the center of the lens 206, Φ(0), is given by the following equation (4):

$$\Phi(0) = \phi(0) - \frac{\omega}{c}F \tag{4}$$

Similarly, the phase shift of a beam 208 incident at the edge of the lens 206, Φ (0) is given by the following equation (3):

$$\Phi(R) = \phi(R) - \frac{\omega}{c}\sqrt{R^2 + F^2} \tag{5}$$

Focusing is achieved by equalizing the total phase of all rays converging at the focal point, that is, $\Phi(0)=\Phi(r)$ for $0<r\leq R$. Note that the insertion phase $\phi(0)$ at the center of the lens is a free parameter the value of which can be chosen to improve lens performance, e.g., minimize the RMS phase error of the actual insertion phase relative to the ideal phase from Equation (6). Therefore, the design parameters for the planar metal lens that focuses all the incident beams at its focal point in given by:

$$\phi(r) = \phi(0) + \frac{\omega}{c}\left(\sqrt{r^2 + F^2} - F\right) \tag{6}$$

Equation (6) yields the lens insertion phase $\phi$ as a function of the radial distance r from the lens center required to compensate path length differences from the lens to a focal point a distance F from the lens. The insertion phase (the phase impressed by the lens on the local electromagnetic field in propagating from one side of the lens to the other) impressed by an opening upon the electromagnetic wave propagating through it is tailored by varying the opening diameter.

Figures 3A, 3B:
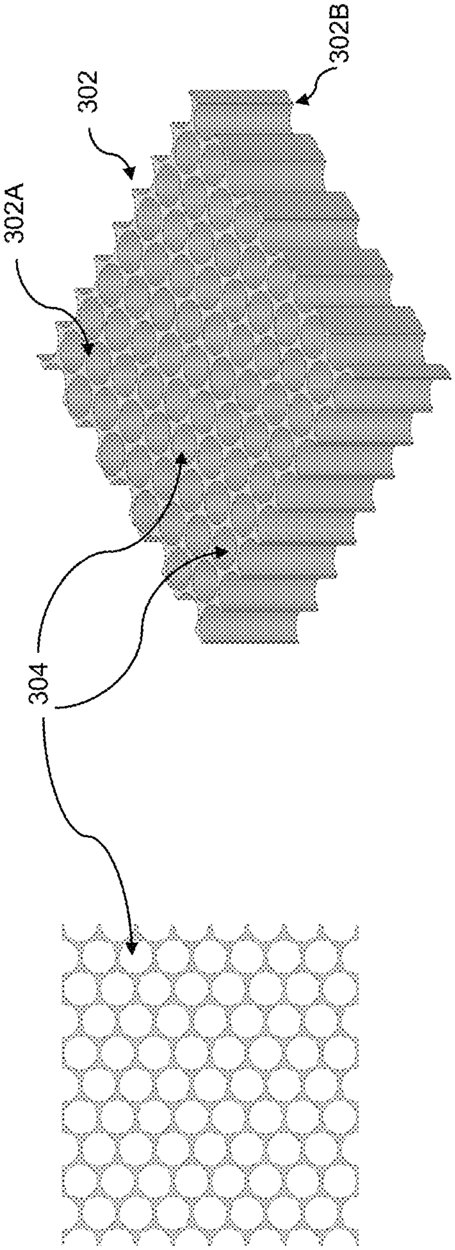
FIGS. 3A and 3B show a planar metal millimeter-wave lens with circular-shaped openings, according to some embodiments of the disclosure.

FIGS. 3A and 3B each show a portion of a planar metal millimeter-wave lens with circular-shaped openings, according to some embodiments of the disclosure. FIG. 3A shows a top view and FIG. 3B shows a perspective view. As shown in these embodiments, a planar metal plate 302 has a first (top) surface 302A and a second (bottom) surface 302B. The two surfaces 302A and 302B are parallel to each other. Cylindrical openings 304 are arranged on a uniform equilateral triangular grid (however, they may be in different patterns depending on the design requirements), where the diameters of the openings are determined based on equation (6). The metal plate thickness is chosen to yield suitable insertion phase range based on equation (6).

Figure 4B:
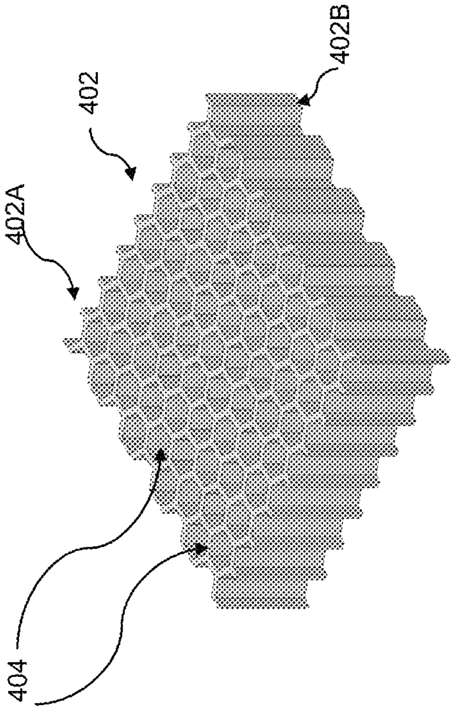
FIGS. 4A and 4B depict a planar metal millimeter-wave lens with hexagonal-shaped openings, according to some embodiments of the disclosure.
Figure 4A:
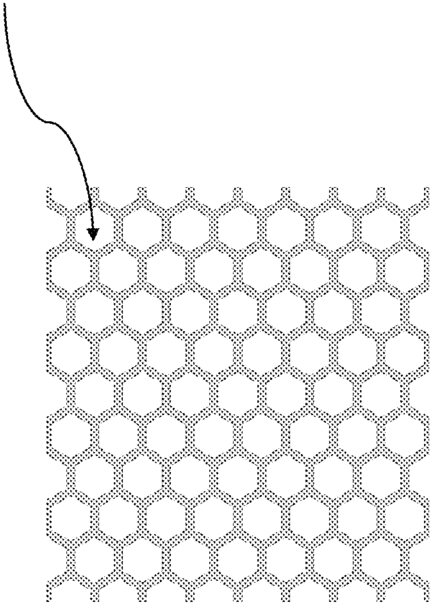

FIGS. 4A and 4B depict a portion of a planar metal millimeter-wave lens with hexagonal-shaped openings, according to some embodiments of the disclosure. FIG. 4A shows a top view and FIG. 4B shows a perspective view of the planar metal lens. As depicted in these embodiments, a planar metal plate 402 has a first (top) surface 402A and a second (bottom) surface 402B. The two surfaces 402A and 402B are parallel to each other. Hexagonal openings 404 are arranged on a uniform equilateral triangular grid (however, they may be in different patterns depending on the design requirements), where the diameters of the openings are determined numerically. The metal plate thickness is chosen to yield suitable insertion phase range based on equation (6).

In these embodiments, the openings are hexagonal rather than cylindrical. With hexagonal openings, an opening having the same cross-sectional area as the maximum-diameter cylindrical openings of FIGS. 3A and 3B may yield a uniform web (i.e., the material separating two adjacent openings) between openings that may be more than twice as thick as web for cylindrical openings.

Hexagonal-shaped openings allow for a thicker metal web between openings of uniform thickness. For a given opening spacing and openings of the same cross-sectional area, hexagonal openings yield a larger web thickness than the circular openings, a difference which may be significant for larger openings. For example, if the center-to-center opening spacing is 120 mils, circular openings of 110 mils in diameter leave a web that has a minimum thickness of 10 mils. Hexagonal openings of width about 100 mils yields openings having the same cross-sectional area as the 110 mil-diameter circular opening, but a uniform web thickness of more twice that for circular openings of the same area. Increasing the web thickness increases the stiffness of the plate at its weakest points as well as improving thermal conductivity.

In some embodiments, the openings (holes) of the planar metal lens may be manufactured by selecting a metal plate with a thickness chosen to yield a suitable (predetermined) insertion phase range, based on the application of the lens. A high-power laser or CNC (computer numerical control) machine tools may then be used to drill the openings of predetermined shape and diameter sizes according to the design parameters of the lens. In some embodiments, the openings may be created by conventional machining, additive manufacturing, chemical machining or electroforming of multiple identical thin metal plates which are diffusion bonded to form a single thicker metal plate. This way, the manufacturing process supports many high-performance metals including aluminum, titanium, stainless steel, and the like with the quality required for critical planar metal millimeter-wave lens applications. Due to the nature of the process, a high degree of control and process capability is possible.

The size of each opening is a function of a position of each opening on the plate such that an insertion phase collectively imposed by the openings on an incident wave causes the incident wave to pass through the first surface and the planar conductive plate and exiting from the second surface to be focused a predetermined distance (F) from the second surface.

This way, the axis of each opening is perpendicular to the surfaces of the planar conductive plate. The size of each opening is a function of a position of the opening on the planar conductive plate such that an insertion phase collectively imposed by the openings on an incident wave causes the incident wave to pass through the first surface and the planar conductive plate, exit from the second surface, and to be focused at a predetermined distance (F) from the second surface.

Figure 5:
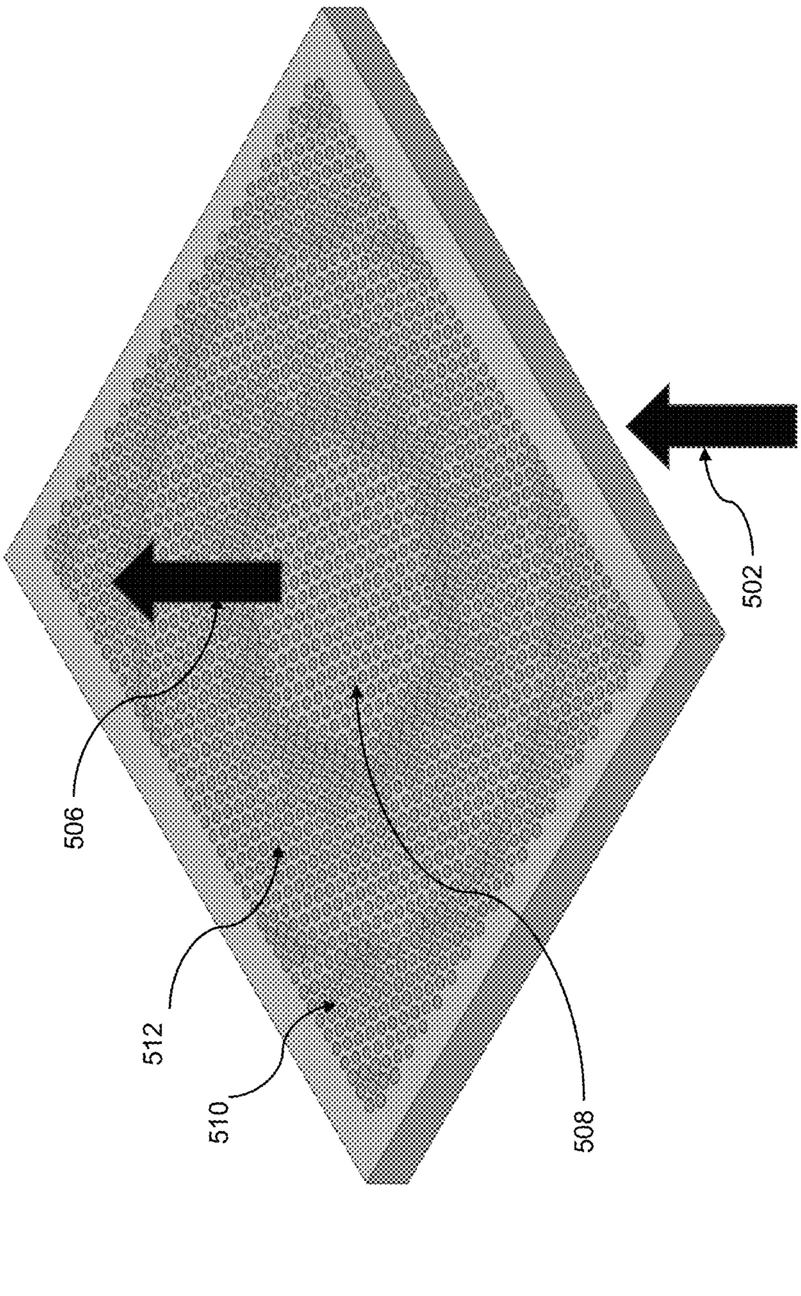
FIG. 5 shows millimeter waves incident on a planar metal millimeter-wave lens, according to some embodiments of the disclosure.

FIG. 5 shows millimeter waves incident on a planar metal millimeter-wave lens, according to some embodiments of the disclosure. As shown, incident millimeter waves 502 enter the planar metal lens 500. The planar metal lens 500 includes a central region 508 with certain opening diameter/ area size and arrangement pattern, an intermediate region 512 with certain opening diameter/area size and arrangement pattern, and a perimeter region 510 with certain opening diameter/area size and arrangement pattern. The opening diameter/area sizes in each region may vary, based on the design parameters, such as, the insertion phase range, as described above. The incident millimeter-wave 502 propagates through the openings, exits the lens as millimeter-wave 506 and focuses at the focal point of lens 500.

Figure 6:
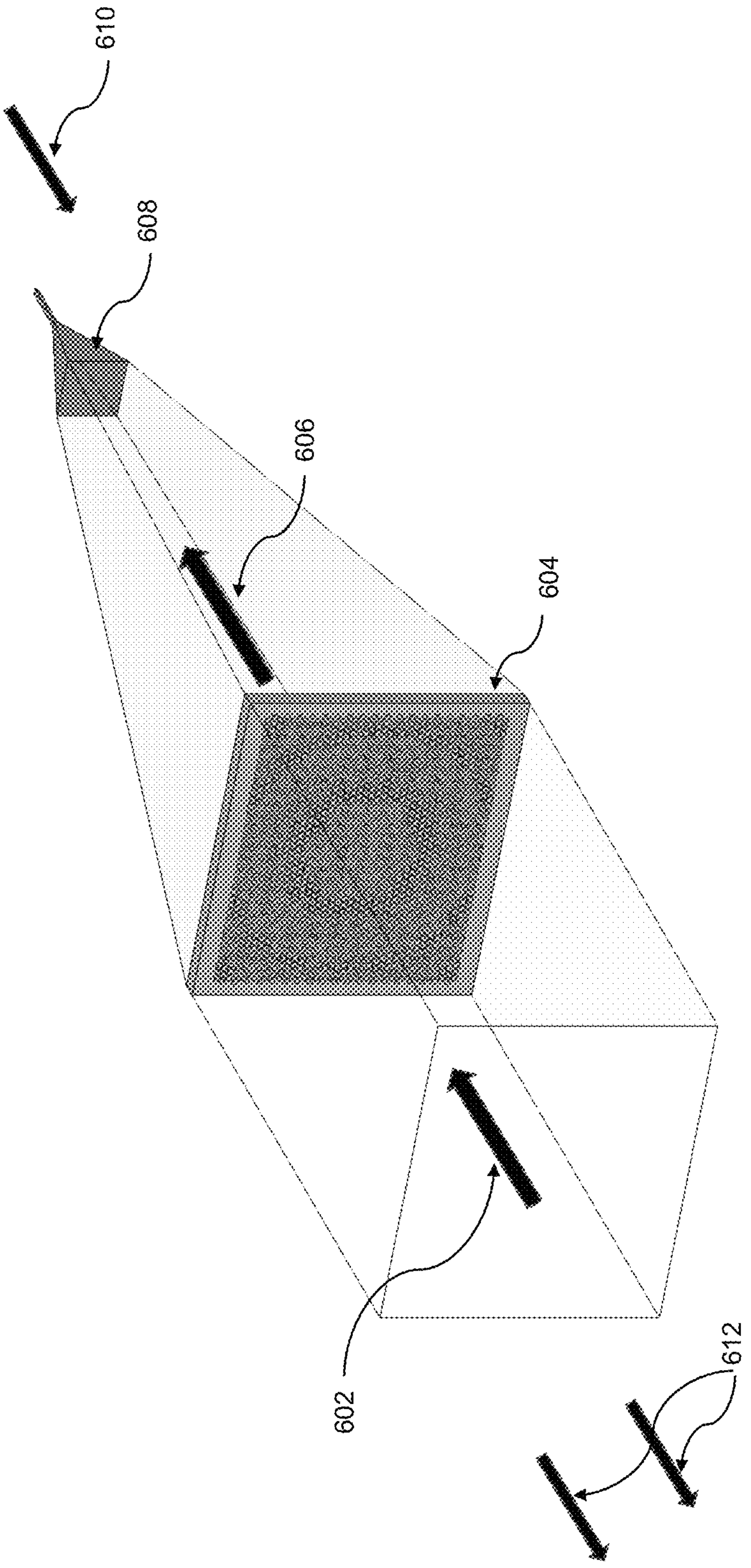
FIG. 6 depicts a planar metal millimeter-wave lens with an antenna configured as a receiving and transmitting lens, according to some embodiments of the disclosure.

FIG. 6 depicts a planar metal millimeter-wave lens with an antenna configured as a receiving and transmitting lens, according to some embodiments of the disclosure. The planar metal millimeter-wave lens 604 is disposed in association with an antenna 608 (e.g., a horn antenna), as a quasi-optical element for millimeter-waves, to produce a focused or collimated millimeter wave beam.

In a transmit mode, the antenna 608 transmits millimeter waves 610 that illuminate one side of the planar metal lens 604 (the back side in FIG. 6, not visible) to generate a collimated output beam 612 that propagates away from the visible side of the planar metal lens 604, as shown in FIG. 6. In a receive mode the planar metal lens 604 is illuminated by a plane wave or a collimated beam 602 incident on the visible side of the planar metal lens 604 6. The incident millimeter waves are focused by the lens to a focal point within antenna 608.

The planar construction of the planar metal lens of the present disclosure simplifies fabrication, reduces thickness and complexity of conventional zone-plate designs. Moreover, all-metal construction yields high power handling capability and a low thermal resistance path for absorbed energy. Additionally, the metal lens acts as a protective radome for the aperture, providing armored protection without a performance penalty. In some embodiments, the planar metal/conductive plate may be a dielectric material coated with a suitable conductor (e.g., copper, gold, etc). The dielectric material is chosen for its mechanical and/or thermal properties rather than its electrical properties, since the plating shields it from incident electromagnetic waves.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

The invention claimed is:

1. A planar conductive millimeter-wave lens comprising:

a single planar conductive plate with a first surface and a second surface, wherein the first surface is parallel to the second surface;

a plurality of openings from the first surface through the planar conductive plate to the second surface, wherein an axis of each opening is perpendicular to the first surface and the second surface, wherein a size of each opening is a function of a position of said each opening on the planar conductive plate such that an insertion phase collectively imposed by the openings on an incident wave causes the incident wave to pass through the first surface of the single planar conductive plate, exit from the second surface and to focus at a predetermined distance from the second surface, without passing through another conductive plate.

2. The planar conductive millimeter-wave lens of claim 1, wherein the openings are arranged in the planar conductive plate in an equilateral triangular pattern.

3. The planar conductive millimeter-wave lens of claim 1, wherein the openings are arranged in the planar conductive plate in a rectangular, square or circular pattern.

4. The planar conductive millimeter-wave lens of claim 1, wherein a shape of the plurality of openings is circular.

5. The planar conductive millimeter-wave lens of claim 1, wherein a shape of the plurality of openings is hexagonal.

6. The planar conductive millimeter-wave lens of claim 1, wherein the planar conductive plate comprises of a dielectric material coated with a conductive material.

7. The planar conductive millimeter-wave lens of claim 6, wherein the conductive material is aluminum, copper, silver, or gold.

8. The planar conductive millimeter-wave lens of claim 1, wherein the conductive plate is a solid metal plate.

9. The planar conductive millimeter-wave lens of claim 8, wherein the solid metal plate is aluminum, titanium or stainless steel.

10. The planar conductive millimeter-wave lens of claim 1, wherein the planar conductive millimeter-wave lens is a Fresnel lens.

* * * * *